(12) United States Patent
Groezinger

(10) Patent No.: US 10,918,002 B1
(45) Date of Patent: Feb. 16, 2021

(54) DEFOLIATOR

(71) Applicant: Mario Groezinger, Freeport, IL (US)

(72) Inventor: Mario Groezinger, Freeport, IL (US)

(*) Notice: Subject to any disclaimer, the term of this patent is extended or adjusted under 35 U.S.C. 154(b) by 319 days.

(21) Appl. No.: 16/120,806

(22) Filed: Sep. 4, 2018

Related U.S. Application Data

(60) Provisional application No. 62/554,631, filed on Sep. 6, 2017.

(51) Int. Cl.
*A01B 41/04* (2006.01)
*A01B 73/06* (2006.01)
*A01D 45/22* (2006.01)
*A01D 84/00* (2006.01)
*A01D 45/24* (2006.01)

(52) U.S. Cl.
CPC .............. *A01B 41/04* (2013.01); *A01B 73/06* (2013.01); *A01B 73/065* (2013.01); *A01D 45/22* (2013.01); *A01D 84/00* (2013.01); *A01D 45/24* (2013.01)

(58) Field of Classification Search
CPC ....... A01B 41/04; A01B 73/02; A01B 73/065; A01B 73/067; A01D 45/22; A01D 45/24; A01D 45/16; A01D 2023/022; A01D 84/00; A01D 75/28; A01D 75/285; A01D 75/287; A01D 84/02
See application file for complete search history.

(56) References Cited

U.S. PATENT DOCUMENTS

| | | | | |
|---|---|---|---|---|
| 2,195,381 A | * | 3/1940 | Patterson | A01D 45/22 56/344 |
| 3,141,284 A | * | 7/1964 | Reynolds | A01D 57/30 56/354 |
| 3,613,345 A | * | 10/1971 | Cofer | A01D 89/002 56/364 |
| 3,651,625 A | * | 3/1972 | Redford | A01D 45/22 56/128 |

(Continued)

FOREIGN PATENT DOCUMENTS

| | | | | |
|---|---|---|---|---|
| CA | 1181246 A | * | 1/1985 | ............. A01D 45/16 |
| CN | 108811716 A | * | 11/2018 | |

OTHER PUBLICATIONS

University of Illinois, Fewer leaves on soybean plants: A way to boost yields? (Dec. 6, 2006): https://www.deltafarmpress.com/soybeans/fewer-leaves-soybean-plants-way-boost-yields.

*Primary Examiner* — Alicia Torres
(74) *Attorney, Agent, or Firm* — Craig A. Fieschko, Esq.; Dewitt LLP

(57) ABSTRACT

A defoliator having a frame suitable for mounting to a vehicle supports an elongated main support arm which extends substantially horizontally, and which has a tine-bearing main shaft which rotates to have the tines knock at least some leaves (or portions thereof) from plants beneath. The main support arm rides on wheels, and may pivot and vertically translate with respect to the frame such that the main support arm (and the tined main shaft) will generally follow the elevation and contour of the ground beneath. To (Continued)

defoliate greater areas, one or both ends of the main shaft may be connected to a boom arm hearing a rotating tined arm shaft, which extends the effective length of the main support arm and tined main shaft. The boom arms are preferably capable of folding rearwardly to reduce the effective size of the defoliator for easier transport.

27 Claims, 8 Drawing Sheets

(56) References Cited

U.S. PATENT DOCUMENTS

| | | | | |
|---|---|---|---|---|
| 4,184,314 A | * | 1/1980 | Hobbs | A01D 29/00 |
| | | | | 56/10.3 |
| 4,271,711 A | * | 6/1981 | Vavra | A01B 73/04 |
| | | | | 172/311 |
| 4,496,004 A | * | 1/1985 | Frase | A01B 73/067 |
| | | | | 172/311 |
| 9,615,513 B2 | * | 4/2017 | Ubaldi | A01D 57/28 |
| 9,775,294 B2 | * | 10/2017 | Bertino | A01D 51/002 |

* cited by examiner

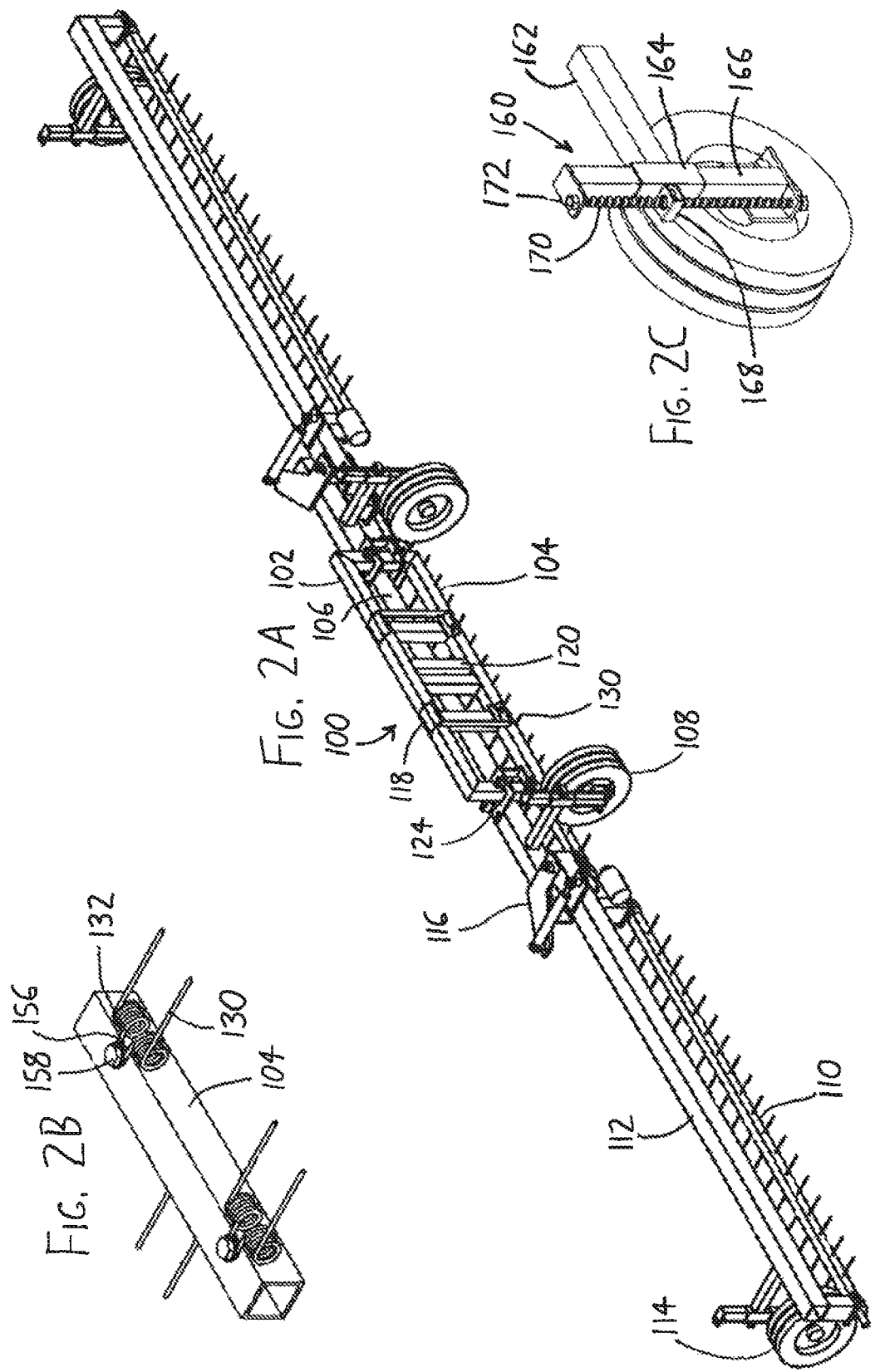

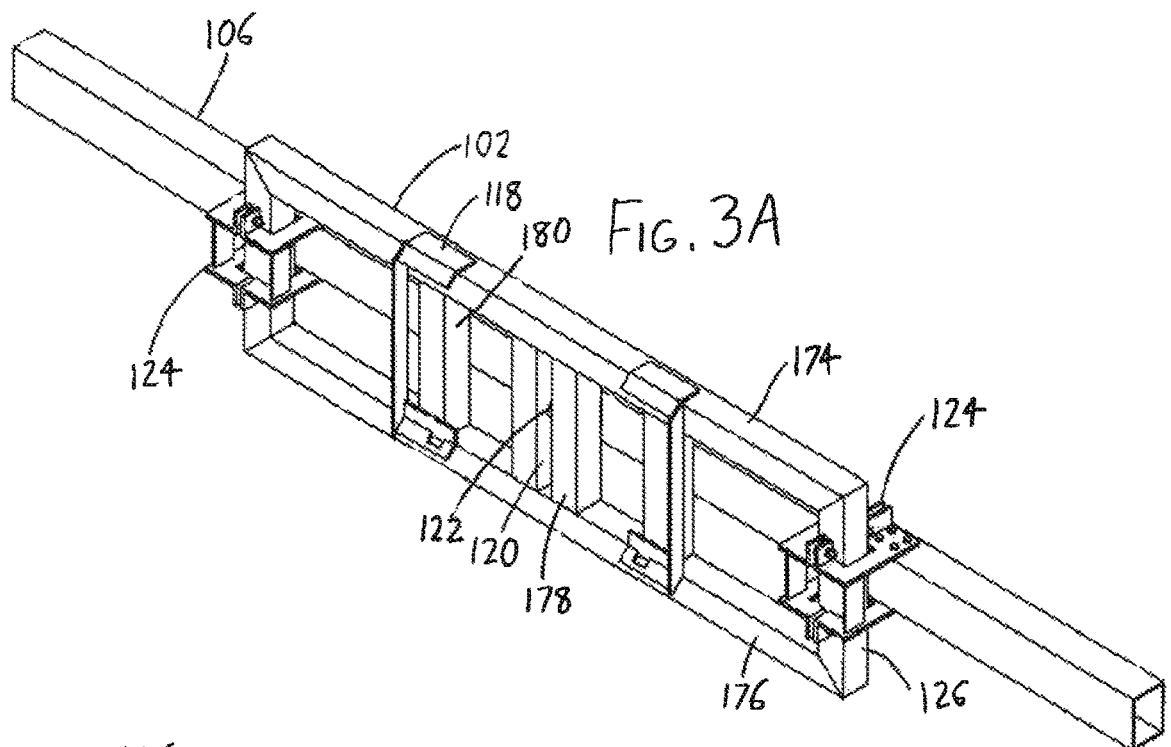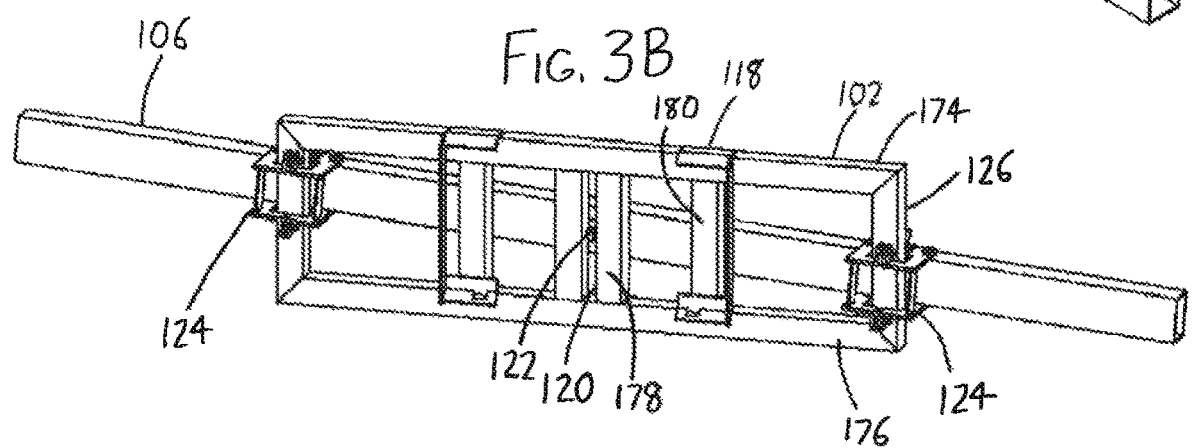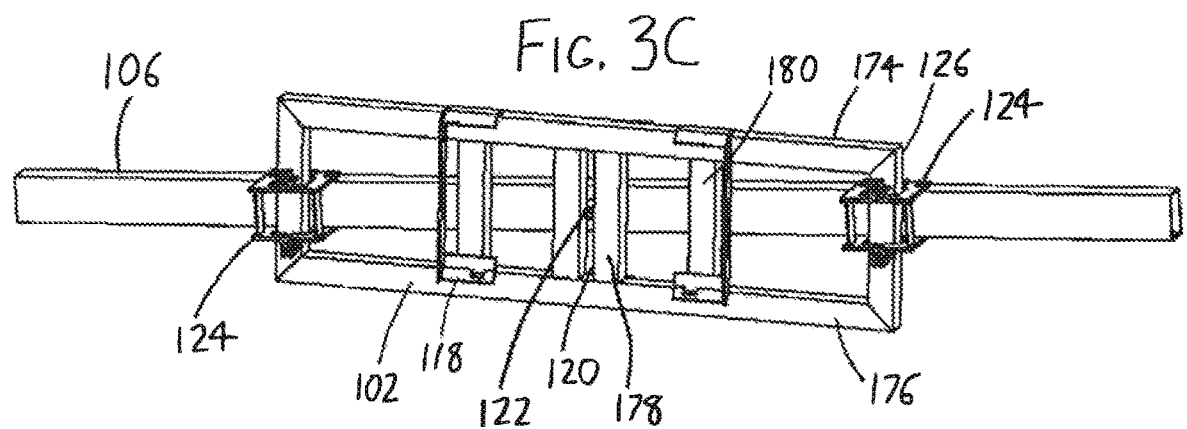

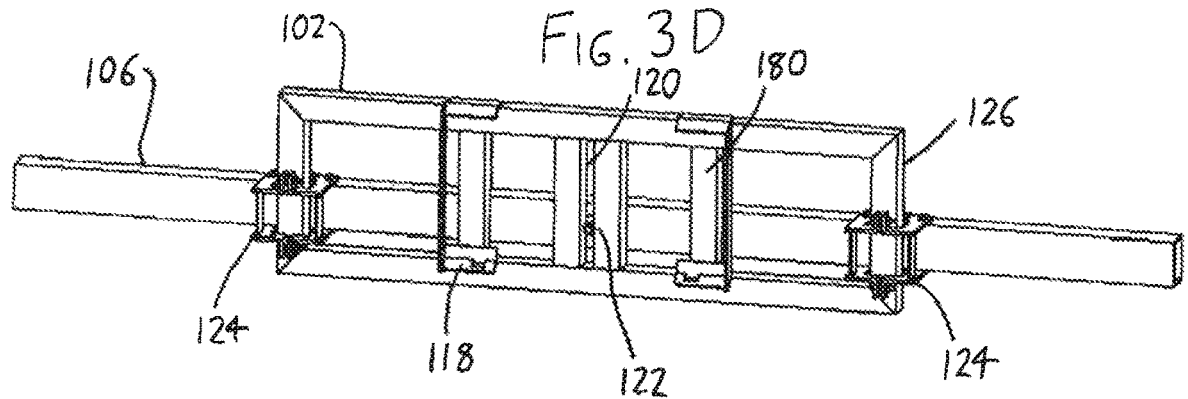
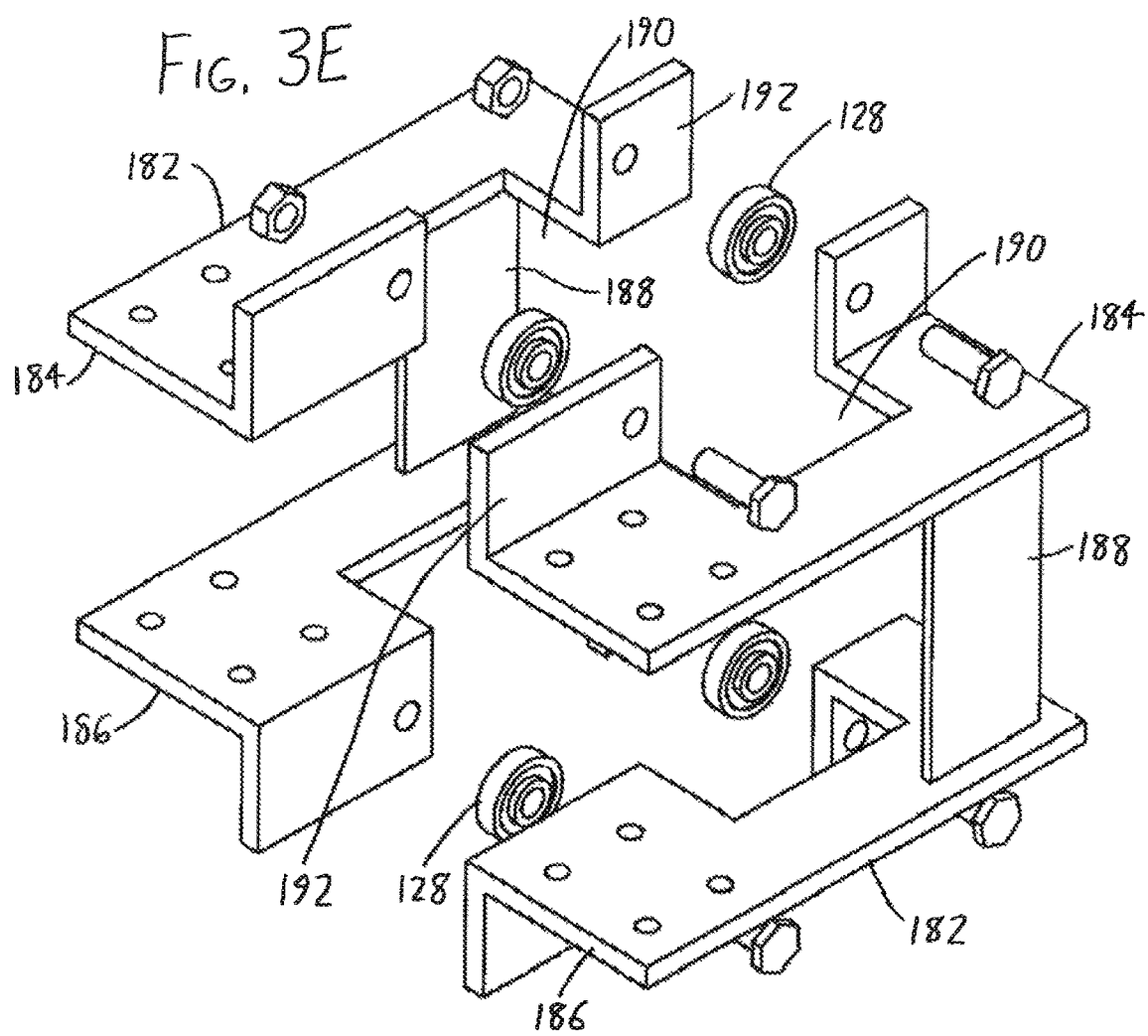

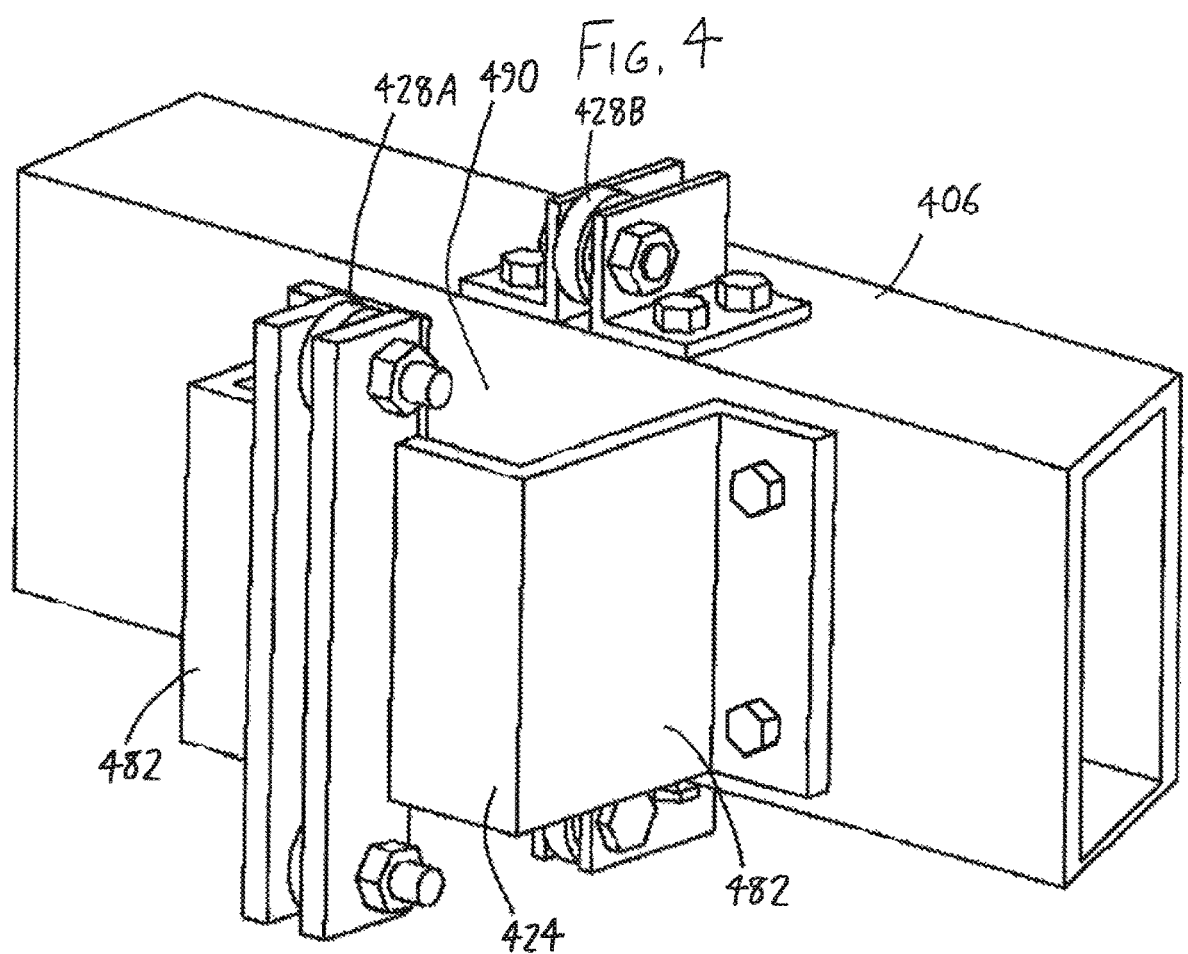

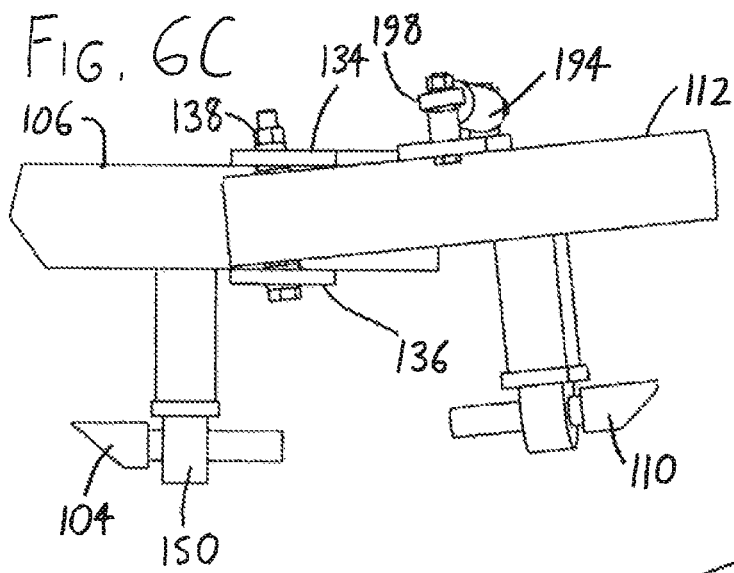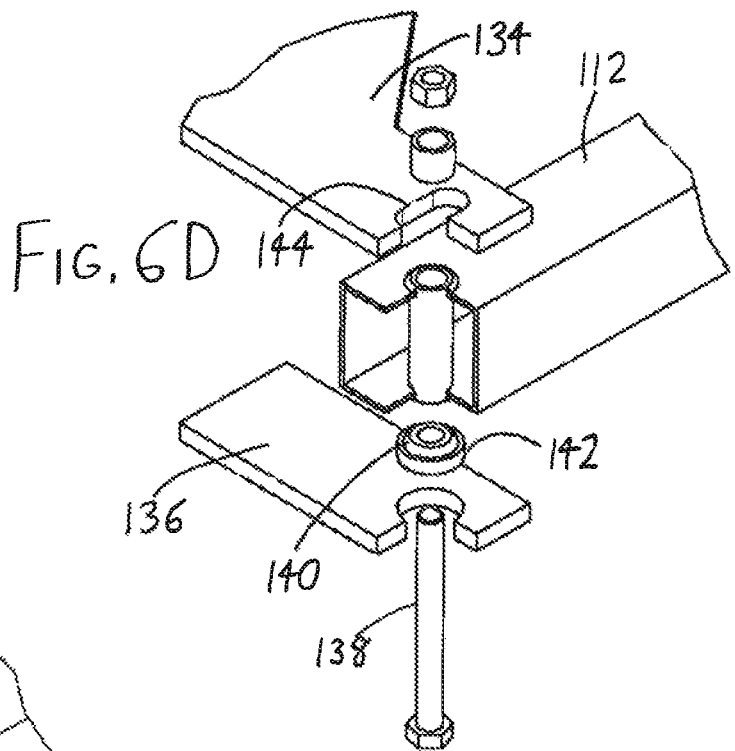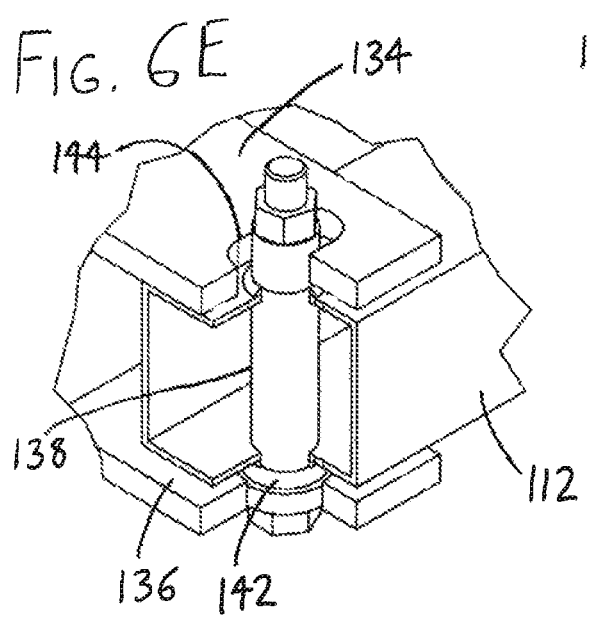

DEFOLIATOR

CROSS-REFERENCE TO RELATED APPLICATIONS

This application claims priority under 35 USC § 119(e) to U.S. Provisional Patent Application 62/554,631 filed Sep. 6, 2017, the entirety of which is incorporated by reference herein.

FIELD OF THE INVENTION

The invention relates to a defoliator for removing at least some leaves, or portions of leaves, from crops and other leafy ground plants, in particular soybean plants.

BACKGROUND OF THE INVENTION

The exemplary defoliator shown in the accompanying drawings, and described below, is particularly designed for removal of leaves from soybean plants, which are believed to have increased yield (higher pods per plant, seeds per pod, and/or seeds per pound) when the plants are partially defoliated during one or more portions of their growth cycle. It is believed that by foreclosing some degree of leaf growth—as by removing leaves, or portions thereof, via defoliation—the plants will devote greater resources to (and experience greater growth in) seed production.

SUMMARY OF THE INVENTION

To give the reader a basic understanding of some of the advantageous features of the defoliator, following is a brief summary of exemplary versions of the defoliator, with reference being made to the accompanying drawings (which are briefly reviewed in the following "Brief Description of the Drawings" section of this document) to assist the reader's understanding. Since the following discussion is merely a summary, it should be understood that more details regarding the exemplary versions may be found in the Detailed Description set forth elsewhere in this document. The claims set forth at the end of this document then define the various versions of the defoliator in which exclusive rights are secured.

FIG. 1A shows an exemplary defoliator 100 mounted to an agricultural vehicle 10, with the defoliator 100 shown in a stored (lifted and folded) state allowing the vehicle 10 to more easily transport the defoliator 100. FIG. 1B then shows the defoliator 100 in a deployed (lowered and unfolded) state on the vehicle 10, and FIG. 2A shows the deployed defoliator 100 alone, from its rear. The defoliator 100 includes a frame 102 configured to mount to the vehicle 10; a defoliating main shaft 104 rotatably connected to a main support arm 106, wherein the main support arm 106 is connected to ground-engaging main arm wheels 108, and is constrained to move on the frame 102 as it rises and falls with the terrain upon which the main arm wheels 108 ride; and a pair of defoliating arm shafts 110, each being rotatably connected to a boom arm 112, with each boom arm 112 bearing a ground-engaging boom arm wheel 114 at or near its outer end, and being affixed at its inner end to an end of the main support arm 106 by a pivot 116. Each pivot 116 allows its boom arm 112 to pivot with two degrees of freedom: in an approximately horizontal plane between a folded state (FIG. 1A) and an unfolded state (FIG. 1B), and in vertical planes to accommodate the rises and falls of the boom arm 112 with respect to the terrain upon which the boom arm wheels 114 ride (with pivoting between the boom arm 112 and main support arm 106 being depicted in FIG. 6C). Each of these components will now be discussed in turn in greater detail.

As seen in FIGS. 1A-1B, the frame 102 is configured to mount to a vehicle 10 with its frame length oriented perpendicular to the direction along which the vehicle 10 travels. Looking to FIG. 3A, the frame 102 can be configured to mount to a vehicle 10 by providing it with conventional agricultural quick-attach couplings 118 suitable for engagement by skid steer loaders, tractors, and other agricultural vehicles.

Looking again to FIG. 3A, as well as FIGS. 3B-3D, the main support arm 106 has a main support arm length extending along the frame length, and is both pivotable and vertically translatable with respect to the frame 102 in planes oriented perpendicular to the direction along which the vehicle 10 travels. This may be done by providing the frame 102 with a vertical track 120, which is preferably situated approximately halfway across the frame length, and including a protruding member 122 on the main support arm 106 which is restrained to pivot within and ride along the track 120. To further support the main support arm 106 on the frame 102, the main support arm 106 may include a pair of collars 124 (with an exemplary collar 124 being shown disassembled in FIG. 3E), with each collar 124 at least substantially encircling a portion of the frame 102 (here on opposing vertical frame beams 126). Rollers 128 (FIG. 3E) can be situated between the main support arm 106 and the frame 102, whereby the rollers 128 bear against (and roll on) at least one of the main support arm 106 and the frame 102 as the main support arm 106 pivots and/or translates with respect to the frame 102. Here, the main support arm 106 (and more particularly its collars 124) has rollers 128 which ride along the vertical frame beams 126 as the main support arm 106 pivots and/or translates with respect to the frame 102. As best seen in FIGS. 1A-1B and FIG. 2A, the main arm wheels 108 descend from opposing ends of the main support arm 106 (with an exemplary wheel 108 being shown in FIG. 2C), such that when the main arm wheels 108 rise or fall as they travel along any ground beneath, the corresponding portions of the main support arm 106 rise or fall, causing the main support arm 106 to pivot and/or translate with respect to the frame 102.

Looking particularly to FIGS. 1B and 2A, the main shaft 104 has a main shaft length extending adjacent the main support arm 106, with the main shaft 104 having protruding tines 130 arrayed along the main shaft length. The main shaft 104 is rotatably connected to the main support arm 106 so that it may be rotated as the vehicle 10 travels across a field, with the main shaft's tines 130 striking any leafy plants (e.g., soybeans) adjacent the main shaft 104, thereby removing at least some of the leaves (and/or portions of the leaves) from the plants. An exemplary tine arrangement is shown in FIG. 2B, wherein the tines 130 extend tangentially from a coil spring 132 affixed to the main shaft 104.

As seen in FIGS. 1A and 1B, each boom arm 112 may rotate about its pivot 116 at its inner end between an unfolded state (FIG. 1B) wherein the boom arm 112 is approximately parallel to the main support arm 106 to a folded state (FIG. 1A) wherein the boom arm 112 is more perpendicular to the main support arm 106 than parallel. The outer end of each boom arm 112 has a ground-engaging boom arm wheel 114 descending therefrom, with the wheel of FIG. 2C exemplifying an arrangement suitable for this purpose.

Looking to FIGS. 6A-6E (and particularly FIGS. 6A-6B), the pivot 116 connecting the boom arm 112 and the main support arm 106 preferably has upper and lower mounts 134 and 136 extending from the main support arm 106, and a pin 138 (see particularly FIGS. 6O-6E) rotatably affixing the boom arm 112 between the upper and lower mounts 134 and 136. The pin 138 is pivotally affixed with respect to the lower mount 136 to pivot in vertical planes, with this pivotal affixment being provided by a ball 140 on the pin 138 which is received within a socket 142 on the lower mount 136. The pin 138 then extends within a slot 144 defined in the upper mount 134, the slot 144 preferably having a length extending approximately parallel to the main support arm 106 and its arm shaft 110, whereby pivoting of the pin 138 in vertical planes moves the pin 138 along the slot 144. As a result, the boom arm 112 may vertically pivot 116 with respect to the main support arm 106 as seen in FIG. 6C. This arrangement may be modified, as by providing the upper and lower mounts 134 and 136 on the boom arm 112 and rotatably affixing the main support arm 106 between the mounts 134 and 136 via the pin 138, and/or by situating the slot 144 in the lower mount 136 and the pivotal pin affixment in the upper mount 134.

Again referring particularly to FIGS. 1B and 2A, each arm shaft 110 is configured similarly to the main shaft 104, with an arm shaft length extending adjacent the length of the boom arm 112, and with the arm shaft 110 having protruding tines 146 arrayed along the arm shaft length (preferably as shown in FIG. 2B and discussed previously with respect to the main shaft 104). Each arm shaft 110 is rotatably connected to its boom arm 112 so that it may be rotated while the vehicle 10 travels across a field with the boom arm 112 in its unfolded state, with the arm shaft's tines 146 striking any leafy plants adjacent the arm shaft 110, thereby removing at least some of the leaves from the plants.

The defoliator 100 may therefore be placed in the stored state of FIG. 1A for transport to and from a field, and in the deployed state of FIG. 1B to defoliate leafy plants (e.g., soybeans) in the field. By removing at least some of the plants' leaves (or portions thereof) during certain portions of the growth season, yields might be increased.

Further potential advantages, features, and goals of the invention will be apparent from the remainder of this document in conjunction with the associated drawings.

BRIEF DESCRIPTION OF THE DRAWINGS

FIG. 2A shows the rear of the deployed defoliator 100 of FIG. 1B.

FIG. 2B shows a section of the main shaft 104 of the defoliator 100 of FIGS. 1A-1B, with a preferred tine arrangement.

FIG. 2C shows a preferred arrangement for attaching the main arm wheels 108 at or near the ends of the main support arm 106 of the defoliator 100 of FIGS. 1A-1B.

FIGS. 3A-3D show the defoliator frame 102 of FIG. 2A without the boom arms 112, and with the main support arm 106 (shown without the main shaft 104) depicted in a variety of positions on the frame 102.

FIG. 3E is an exploded (disassembled) view of one of the collars 124 used to connect the main support arm 106 to the outer vertical frame beams 126 of the frame 102 in FIGS. 3A-3D.

FIG. 4 shows an alternative collar 424 mounted on a section of a main support arm 406.

FIGS. 6A-6E illustrate the pivot 116 between the main support arm 106 and the boom arm 112 shown at the lower left of the defoliator 100 of FIGS. 1A-1B.

DETAILED DESCRIPTION OF EXEMPLARY VERSIONS OF THE INVENTION

Figure 1A:
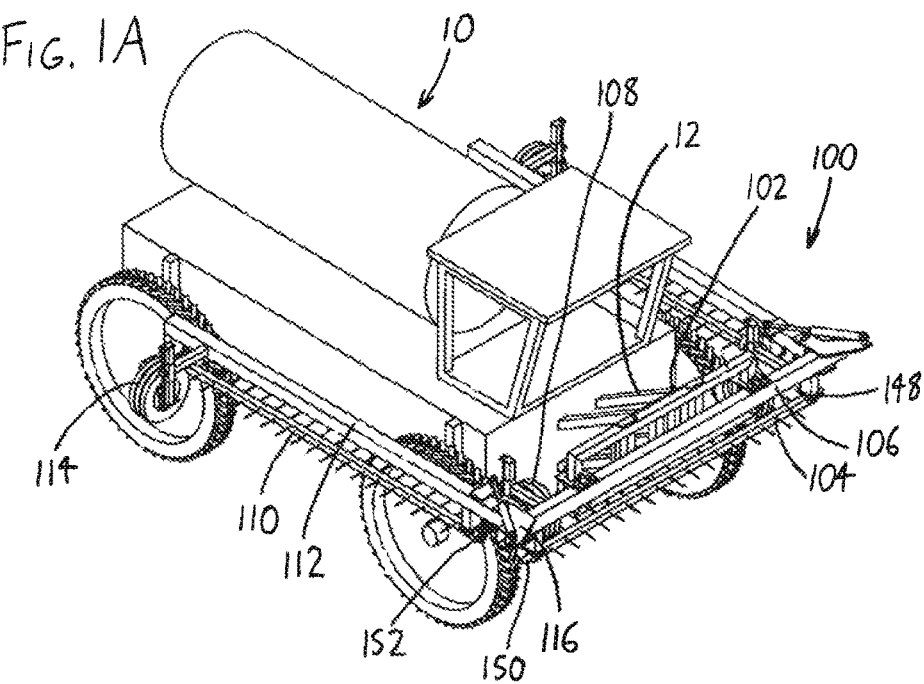
FIG. 1A is a perspective view of an exemplary farm vehicle 10 having an exemplary defoliator 100 mounted thereon, with the defoliator 100 being shown in a stored state wherein it is lifted off the ground by the vehicle's arms 12 with its boom arms 112 folded.
Figure 1B:
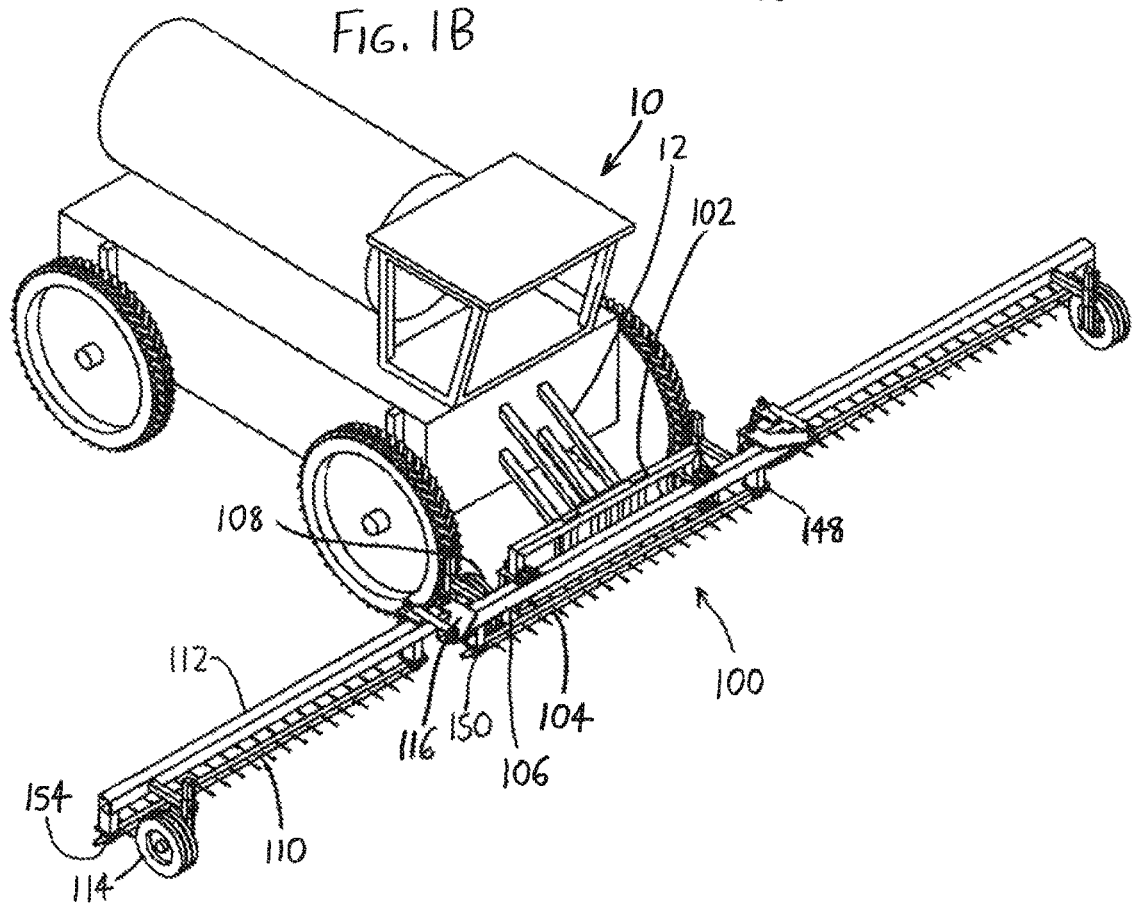
FIG. 1B depicts the exemplary farm vehicle 10 and defoliator 100 of FIG. 1 wherein the defoliator 100 is shown in a deployed state riding on the ground in front of the vehicle 10 with its boom arms 112 unfolded.

Expanding on the discussion above, it is emphasized that the vehicle 10 shown in FIGS. 1A-1B is merely exemplary, and the defoliator 100 may instead be used with different types of vehicles having different configurations. The depicted vehicle 10, a sprayer, is equipped with vehicle arms 12 which raise and lower in the manner of a skid steer loader, and which terminate in fixtures suitable for attachment/detachment to the connectors 118 of FIGS. 2A and 3A. However, the connectors 118, and more generally the frame 102 (and the main support arm 106 and boom arm(s) 112), may be differently sized and configured to accommodate any suitable vehicle 10.

Figure 6A:
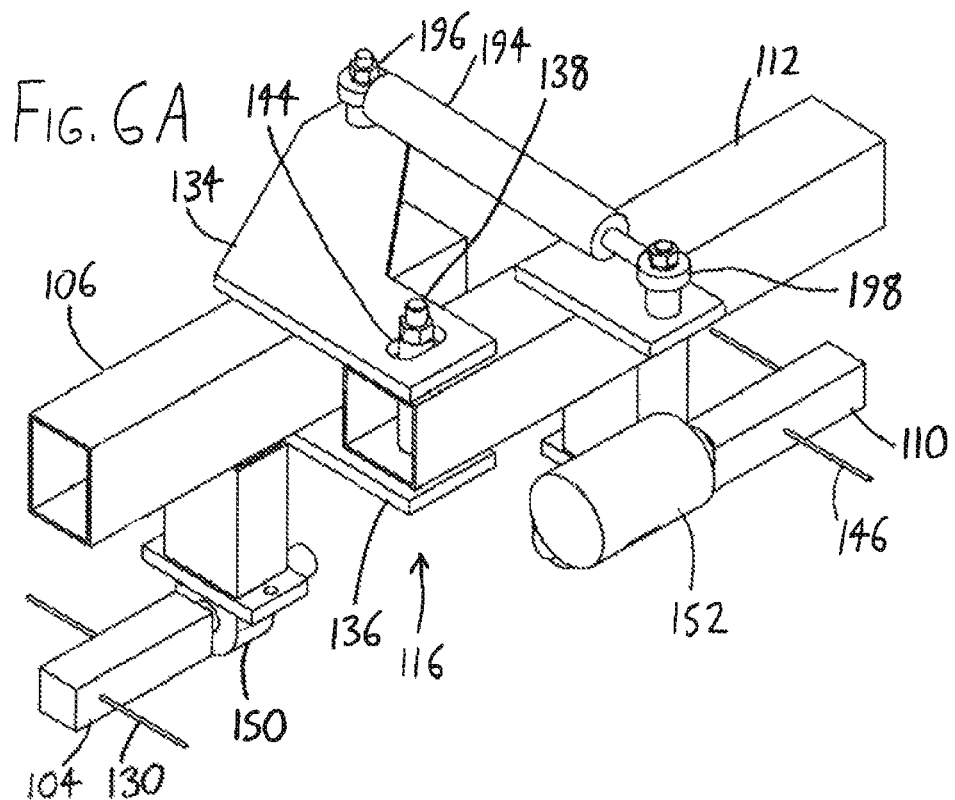
Figure 6B:
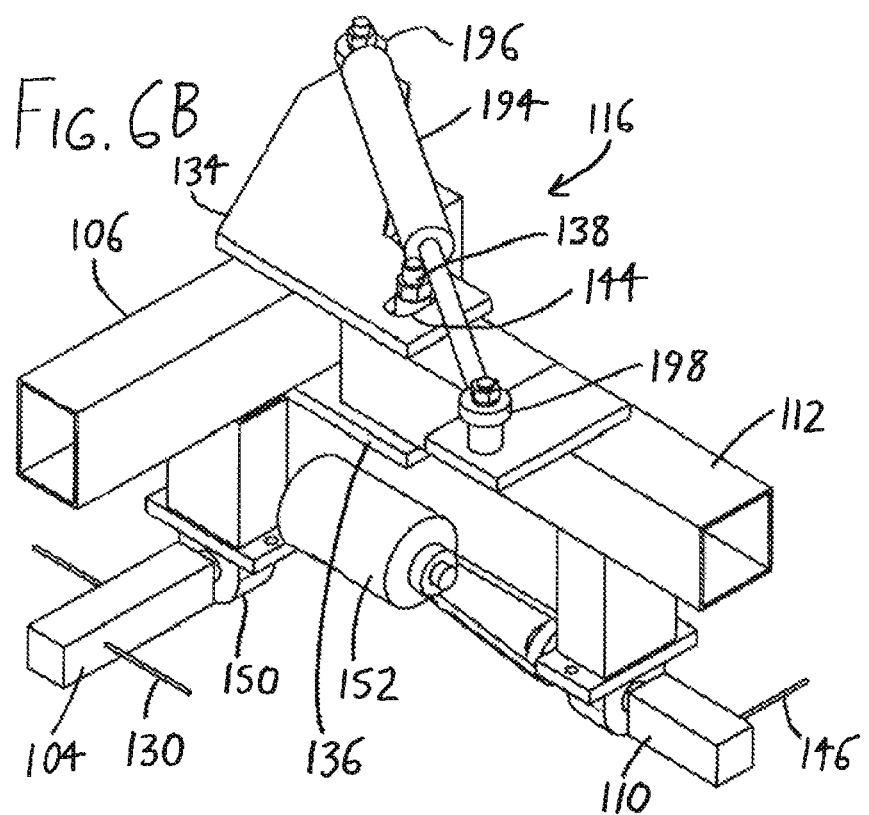

Looking particularly to FIG. 1A, the main shaft 104 and its defoliating tines 130 are rotatably driven adjacent the main support arm 106 by a motor 148 and an opposing bearing 150 attached to the main support arm 106. The arm shafts 110 and their defoliating tines 146 are similarly rotatably driven adjacent the boom arms 112 by motors 152 (FIG. 1A, see also FIGS. 6A-6B) and opposing bearings 154 (FIG. 1B). As seen in FIG. 2B, the main shaft 104 is configured as a square tube having tines 130 protruding from its opposing sides at regular intervals along the length of the shaft 104. The arm shaft 110 is preferably similarly configured. At least for defoliation of soybeans, the tines 130 are preferably linear, that is, they lack curves, bends, or projections along their length. However, the sizes, configurations, and spacings of the tines 130 (as well as the rotational speed of the tines' shaft 104) may be altered to better defoliate any particular plant. In FIG. 2B, the tines 130 are configured as elongated outwardly-extending terminal ends of coil springs 132, with the midsection of each spring departing from the coil 132 to define a loop/ring 156 oriented in a plane tangential to the coil 132, whereby a bolt or other fastener 158 may be inserted into the loop/ring 156 to connect the coil 132 to the main shaft 104. The springs 132 allow the tines 130 to resiliently bend out of, and snap back into, their nominal positions if they strike unyielding objects.

The arrangement for attaching the main arm wheels 108 at or near the ends of the main support arm 106 is shown in greater detail in FIG. 2C. The wheel 108 is mounted on a screw jack 160 which attaches to the main support arm 106 via a wheel strut 162. The screw jack 160 includes a jack collar 164 affixed to the wheel strut 162, with the jack collar 164 being closely and slidably fit about a vertical jack shaft 166 upon which the wheel is rotatably mounted. The jack collar 164 has a jack nut 168 extending therefrom through which a jack screw 170 is threaded, with the jack screw 170 being oriented parallel to, and rotatably mounted to the ends of, the jack shaft 166. By rotating screw nuts 172 at the top or bottom of the jack screw 170, the jack screw 170 turns within the jack nut 168, and thereby moves the jack shaft 166 within the jack collar 164 to allow adjustment of the height between the wheel 108 and the wheel strut 162 (and thus between the wheel 108 and the main support arm 106). A user can therefore use the screw jacks 160 at the opposite ends of the main support arm 106 to situate the main support arm 106 (and thus the defoliating main shaft 104) at a desired height with respect to the terrain beneath. This arrangement is also preferably used to attach the boom arm wheels 114 at or near the ends of the boom arms 112, and thus the boom arms 112 and their defoliating arm shafts 110 can similarly be oriented at a desired height relative to the terrain beneath.

FIG. 3A then shows the frame 102 and main support arm 106 in greater detail, and without the defoliating main shaft 104 and boom arms 112 shown in FIGS. 1A-1B and 2A. The frame 102 has upper and lower horizontal frame beams 174 and 176 joined at their opposing sides by outer vertical frame beams 126. The horizontal frame beams 174 and 176 are also joined by closely spaced inner vertical frame beams 178, each being slightly offset from the middles of the horizontal frame beams 174 and 176, and intermediate vertical frame beams 180, which add further strength to the frame 102. The inner vertical frame beams 178 (and the space therebetween) define the aforementioned track 120 in which the protruding member 122 of the main support arm 106 rotates and translates. The protruding member 122 can be defined by a rod/post which is welded or otherwise affixed to the main support arm 106, or can simply be defined by a protruding bolt or the like. In any event, the protruding member 122 preferably has a rotatable tube or other bearing fit thereover, one having an outer diameter slightly smaller than the space between the inner vertical frame beams 178, so that the protruding member 122 can travel relatively frictionlessly along the track 120. While not shown in the drawings, the protruding member 122 may have a length such that it extends from one side of the inner vertical frame beams 178 to the other, and which then has a nut or other member installed on its end (this member being larger than the space between the inner vertical frame beams 178), thereby preventing the withdrawal of the protruding member 122 from the track 120. As depicted, the main support arm 106 is instead restrained to pivot and vertically translate in the vertical plane adjacent the frame 102 via the collars 124 fit about the outer vertical frame beams 126. One of these collars 124 is shown in an exploded/disassembled state in FIG. 3E, rotated 180 degrees about a vertical axis from the orientation shown in FIG. 3A. The collar 124 is formed as a pair of collar sections 182, one being a mirror image of the other, with each collar section 182 having upper and lower brackets 184 and 186 connected by bridges 188. The upper brackets 184 have gaps 190 defined therein which combine to define a collar aperture which fits closely about the outer vertical frame beam 126 in the forward/rearward direction (i.e., along the direction in which the vehicle 10 travels), but which is sized larger than the outer vertical frame beam 126 in the lateral direction (i.e., in the direction along the frame length). The upper brackets 184 also include upwardly-extending flanges 192 which allow the upper brackets 184 of the collar sections 182 to be bolted or otherwise fastened together about the outer vertical frame beam 126, with rollers 128 being situated between the collar sections 182 and bearing against the outer vertical frame beam 126. The lower brackets 186 of the collar sections 182 are similarly configured to be attached about the outer vertical frame beam 126. The bridge 188 between the upper and lower brackets 184 and 186—which usefully strengthens the collar 124, but need not be included—has the same height as the main support arm 106, such that the main support arm 106 can be received between the upper and lower brackets 184 and 186 and bolted or otherwise attached therebetween. As a result, when the collar sections 182 are installed on the main support arm 106 and about the outer vertical frame beams 126 (as seen in FIG. 3A), the collars 124 (in conjunction with the protrusion 122 riding in the track 120) restrain the main support arm 106 from any substantial lateral/horizontal translation on the frame 102. At the same time, the main support arms 106 can move upwardly and downwardly with respect to the frame 102, with the protrusion 122 riding within the track 120, and with the rollers 128 of the collars 124 riding against the outer vertical frame beams 126. The main support arm 106 may also pivot about the protrusion 122 within a vertical plane parallel to the frame 102, with the additional lateral spacing in the collar apertures 190 accommodating the outer vertical frame beams 126 while doing so. The main support arm 106 can therefore move between a variety of raised/lowered and tilted positions, with examples being shown in FIGS. 3A-3D. Thus, referring back to FIGS. 1B and 2A, when the main arm wheels 108 are installed on the main support arm 106 and the defoliator 100 is in its deployed position with the main arm wheels 108 riding along the ground, the main arm wheels 108 will rise and fall with varying terrain, and the main support arm 106 (and the rotating arm shaft 110 with the tines 130 thereon) will "float" along the ground to accommodate the terrain.

FIG. 4 shows an alternative arrangement wherein the collar 424 is defined in collar sections 482 which are affixed to the rear side of a main support arm 406. Rollers 428A spaced from the rear of the main support arm 406 are sandwiched between the collar sections 482. Supplemental rollers 428B are then mounted on the main support arm 406 adjacent its rear side so that when the collar sections 482 are affixed together on the main support arm 406 about an outer vertical frame beam 126, the outer vertical frame beam 126 is engaged between the rollers 428A and 424B, similar to the collar 124 of FIGS. 3A-3D. At the same time, the collar sections 482 define an aperture 490 therebetween which is laterally sized greater than the width of the outer vertical frame beam 126, such that the collar 424 allows the main support arm 406 to move on the frame 102 as in FIGS. 34-3D.

Figure 5A:
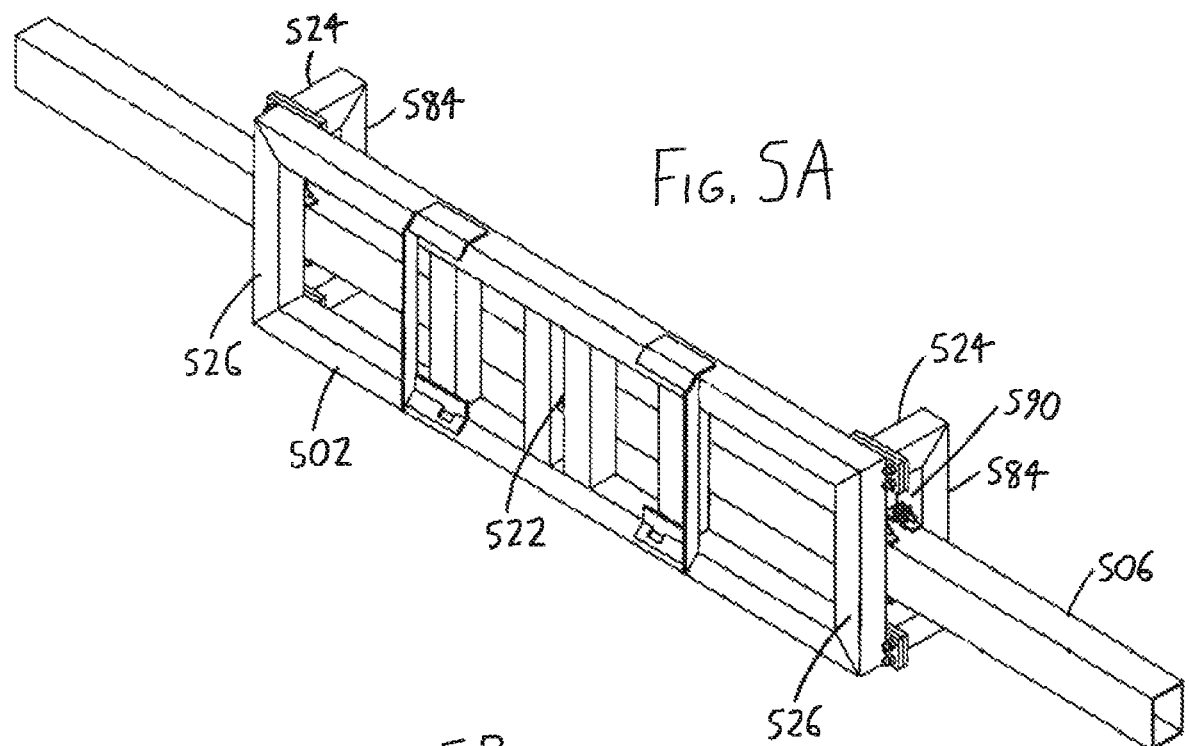
FIGS. 5A-5B show another alternative arrangement for connecting a main support arm 506 to the outer vertical frame beams 526, with the outer vertical frame beams 526 bearing collars 524 wherein the main support arm 506 rides on rollers 528.
Figure 5B:
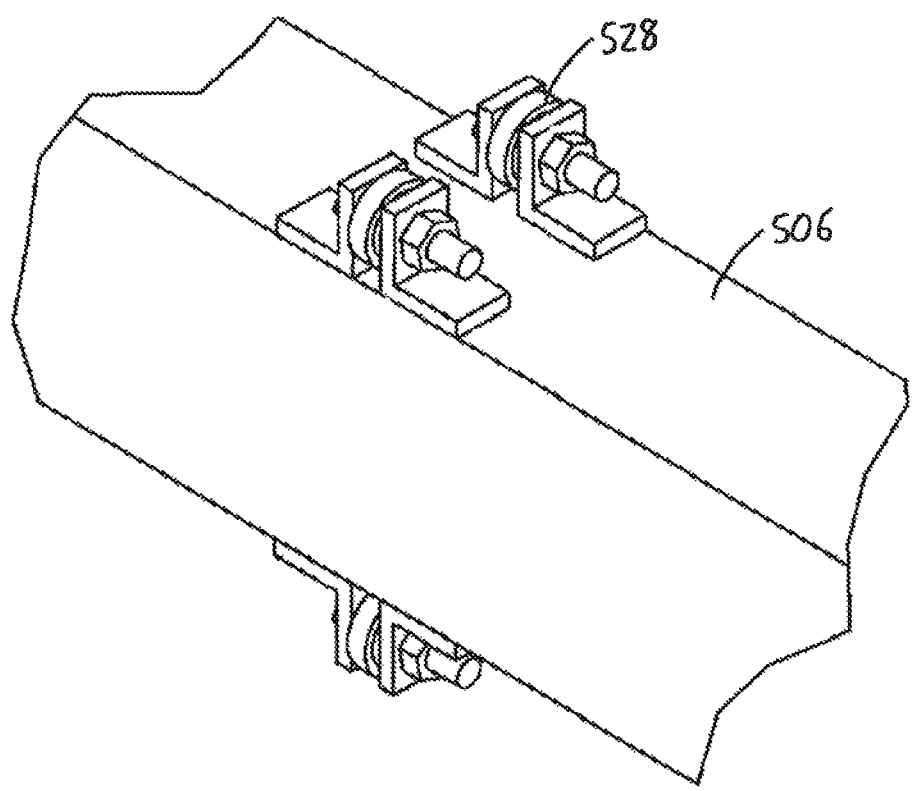

FIGS. 5A-5B then depict another alternative arrangement wherein a frame 502 includes collars 524 which encircle a main support arm 506 at the frame's outer vertical frame beams 526, in contrast to the main support arm including collars which encircle the outer vertical frame beams as in the foregoing arrangements. These collars 524 are provided by C-shaped brackets 584 which bolt or otherwise affix to the outer vertical frame beams 526 at the front of the frame 502, defining vertical slots 590 wherein the main support arm 506 can pivot and/or vertically translate with respect to the frame 502 in a vertical plane parallel to the frame 502. As seen particularly in FIG. 5B, rollers 528 are installed on the main support arm 506, preferably on its upper and lower sides, and ride against the inner surfaces of the collar slot 590 to allow the main support arm 506 to smoothly translate upwardly and downwardly within the collar 524. In this version of the frame 502, the protrusion 522 is the only feature restraining horizontal translation of the main support arm 506 within the frame 502.

FIGS. 6A-6E then illustrate a pivot 116 between the main support arm 106 and the boom arm 112 in greater detail. (This is the pivot 116 of the right boom arm 112, as seen from the rear of the defoliator 100, i.e., from the perspective of the vehicle 10.) The main support arm 106 bears rearwardly-extending upper and lower mounts 134 and 136 on its upper and lower sides, with the upper mount 134 bearing the slot 144 in which the pin 138 may translate as it pivots, and the lower mount 136 bearing the socket 142 (see particularly FIGS. 6D-6E) which pivotally receives a ball 140 (FIG. 6D) affixed about the opposite end of the pin 138. The boom arm 112 is then pinned between the upper and lower mounts 134 and 136 such that it may rotate about the axis of the pin 138, allowing the boom arm 112 to swing between the folded and unfolded states shown in FIGS. 1A-1B. At the same time, because the pin 138 may pivot in vertical planes parallel to the main support arm 106 (and travel in the slot 144 as it does so), the boom arm 112 may pivot 116 upwardly and downwardly (see FIG. 6C for an example), for example, as the boom arm wheel 114 at the end of the boom arm 112 moves up and down while riding on the terrain beneath. The upper mount 134 also extends forwardly of the main support arm 106, angling outwardly with a dogleg bend as it does so. A linear actuator 194, preferably a hydraulic cylinder, is then fixed between a main arm actuator anchor 196 on the forward portion of the upper mount 134 and a boom arm 112 actuator anchor 198 attached to the boom arm 112. Retracting the linear actuator 194 as in FIG. 6A deploys the boom arm 112 (FIG. 1B), whereas extending the linear actuator 194 as in FIG. 6B folds the boom arm 112 (FIG. 1A).

Throughout this document, where the terms "substantially," "approximately," "primarily," "essentially," and the like are used to qualify a value or characteristic, these should be regarded as referring to a variation of 10% from the value or characteristic. Thus, as an example, a collar that "substantially encircles" a vertical frame beam extends between 324 and 360 degrees about the vertical frame beam (324 degrees being 36 degrees—or 10% of 360 degrees—less than 360 degrees). As another example, "approximately perpendicular" and "approximately parallel" can respectively be understood to mean within 9 degrees (i.e., 10% of 90 degrees) from perpendicular and parallel.

When one part is said to be "fixed" to another part, this indicates that the parts are attached in immovable relationship to each other (either directly or via an intervening component), whereas the terms "attached" more broadly indicates that the parts may be somehow connected as a unit (either directly or via an intervening component), though one part may move with respect to the other, or that the parts may be fixed.

The versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A defoliator including:
   a. a frame configured to mount to a vehicle, the frame having a frame length oriented perpendicular to the direction along which the vehicle travels,
   b. a rotatable main shaft having a main shaft length extending adjacent the frame length, the main shaft having tines protruding therefrom and arrayed along the main shaft length,
   c. a main support arm:
      (1) having a main support arm length extending along the frame length,
      (2) having the main shaft rotatably connected thereto,
      (3) being both pivotable and translatable with respect to the frame in planes oriented perpendicular to the direction along which the vehicle travels,
   d. ground-engaging main arm wheels descending from the main support arm,
   whereby:
   A. the main shaft may be rotated during travel of the vehicle when the frame is mounted on the vehicle to strike any leafy plants adjacent the main shaft with the main shaft's tines, thereby removing leaves from the plants, and
   B. the main support arm pivots and/or translates with respect to the frame to accommodate any rising or falling of the ground-engaging main arm wheels along any ground beneath the ground-engaging main arm wheels.

2. The defoliator of claim 1 wherein the tines extend tangentially from a coil spring affixed to the main shaft.

3. The defoliator of claim 1 wherein:
   a. the frame includes a vertical track situated approximately halfway across the frame length, and
   b. the main support arm includes a protruding member restrained to pivot and translate within the track.

4. The defoliator of claim 1 further including rollers situated between the main support arm and the frame, whereby the rollers bear against at least one of the main support arm and the frame as the main support arm pivots and/or translates with respect to the frame.

5. The defoliator of claim 1 wherein:
   a. the frame includes opposing vertical frame arms thereon, and
   b. the main support arm includes rollers which ride along the frame arms as the main support arm pivots and/or translates with respect to the frame.

6. The defoliator of claim 1 wherein the main support arm includes a pair of collars thereon, each collar at least substantially encircling a portion of the frame.

7. The defoliator of claim 1 wherein the frame bears vertical slots wherein the main support arm pivots and/or translates with respect to the frame in planes oriented perpendicular to the direction along which the vehicle travels.

8. The defoliator of claim 1 further including:
   a. an elongated boom arm pivotally affixed to the main support arm, whereby the boom arm may pivot between an unfolded state wherein the boom arm is approximately parallel to the main support arm to a folded state wherein the boom arm is approximately perpendicular to the main support arm,
   b. a rotatable arm shaft having an arm shaft length extending adjacent the length of the boom arm, the arm shaft having tines protruding therefrom and arrayed along the arm shaft length.

9. The defoliator of claim 8 wherein:
   a. one of the main support arm and the boom arm is rotatably affixed by a pin between upper and lower mounts extending from the other of the main support arm and the boom arm,
   b. the pin is pivotally affixed with respect to one of the upper mount and the lower mount, whereby the pin may pivot in vertical planes, and
   c. the pin rests within a slot in the other of the upper mount and the lower mount, whereby pivoting of the pin in vertical planes moves the pin along the slot.

10. The defoliator of claim 1 further including:
a. a rotatable arm shaft having an arm shaft length, the arm shaft having tines protruding therefrom and arrayed along the arm shaft length,
b. an elongated boom arm:
   (1) having the arm shaft rotatably connected thereon, and
   (2) pivotally affixed with respect to the frame, whereby the boom arm may pivot between an unfolded state wherein the arm shaft is approximately parallel to the main shaft to a folded state wherein the arm shaft is approximately perpendicular to the main support arm.

11. The defoliator of claim 10:
a. further including:
   (1) opposing upper and lower mounts, wherein one of the mounts has a slot defined therein,
   (2) a pin extending within the slot, the pin being pivotally affixed to the mount opposite the slotted mount,
b. wherein the boom arm either:
   (1) has the upper and lower mounts affixed to opposing upper and lower sides of the boom arm, or
   (2) has the pin extending between opposing upper and lower sides of the boom arm.

12. The defoliator of claim 11 wherein the boom arm has a ground-engaging boom arm wheel descending therefrom.

13. The defoliator of claim 11 wherein the pin bears a ball pivotally affixed within a socket on the mount opposite the slotted mount.

14. The defoliator of claim 11 wherein the slot has a length extending approximately parallel to the arm shaft.

15. A method of using the defoliator of claim 1, the method including the steps of:
a. mounting the frame to a vehicle, and
b. simultaneously:
   (1) driving the vehicle across a field having leafy plants thereon, and
   (2) rotating the main shaft, thereby striking the plants with the tines, with the rotation being such that some of the leaves of the plants are removed.

16. The method of claim 15 wherein the plants are soybeans.

17. A defoliator including:
a. a frame configured to mount to a vehicle, the frame having a frame length oriented perpendicular to the direction along which the vehicle travels,
b. a main support arm:
   (1) having a main support arm length extending along the frame length,
   (2) being both pivotable and vertically translatable with respect to the frame in planes oriented perpendicular to the direction along which the vehicle travels,
c. an elongated boom arm pivotally affixed to the main support arm, whereby the boom arm may pivot between an unfolded state wherein the boom arm is approximately parallel to the main support arm to a folded state wherein the boom arm is more perpendicular to the main support arm than parallel,
d. a main shaft:
   (1) having a main shaft length extending adjacent the main support arm,
   (2) being rotatably connected to the main support arm, and
   (3) having protruding tines arrayed along the main shaft length,
e. an arm shaft:
   (1) having an arm shaft length extending adjacent the boom arm,
   (2) being rotatably connected to the boom arm, and
   (3) having protruding tines arrayed along the arm shaft length.

18. The defoliator of claim 17 further including:
a. upper and lower mounts extending from one of the main support arm and the boom arm,
b. a pin rotatably affixing the other of the main support arm and the boom arm between the upper and lower mounts, wherein the pin:
   (1) is pivotally affixed with respect to one of the upper mount and the lower mount to pivot in vertical planes, and
   (2) extends within a slot defined in the other of the upper mount and the lower mount, whereby pivoting of the pin in vertical planes moves the pin along the slot.

19. A defoliator including:
a. a frame having a horizontally extending frame length,
b. a main support arm having a main support arm length extending along the frame length,
c. an elongated boom arm,
d. a pivot connecting the boom arm and the main support arm, the pivot having:
   (1) upper and lower mounts extending from one of the main support arm and the boom arm,
   (2) a pin rotatably affixing the other of the main support arm and the boom arm between the upper and lower mounts, wherein the pin:
      (a) is pivotally affixed with respect to one of the upper mount and the lower mount to pivot in vertical planes, and
      (b) extends within a slot defined in the other of the upper mount and the lower mount, whereby pivoting of the pin in vertical planes moves the pin along the slot,
e. a main shaft:
   (1) having a main shaft length extending adjacent the main support arm,
   (2) being rotatably connected to the main support arm, and
   (3) having protruding tines arrayed along the main shaft length,
f. an arm shaft:
   (1) having an arm shaft length extending adjacent the boom arm,
   (2) being rotatably connected to the boom arm, and
   (3) having protruding tines arrayed along the arm shaft length.

20. A defoliator including:
a. a frame configured to mount to a vehicle, the frame having a frame length oriented perpendicular to the direction along which the vehicle travels,
b. a rotatable main shaft having a main shaft length extending adjacent the frame length, the main shaft having tines protruding therefrom and arrayed along the main shaft length,
c. a rotatable arm shaft having an arm shaft length, the arm shaft having tines protruding therefrom and arrayed along the arm shaft length,
d. an elongated boom arm:
   (1) having the arm shaft rotatably connected thereon, and
   (2) pivotally affixed with respect to the frame, whereby:

A. the main shaft may be rotated during travel of the vehicle when the frame is mounted on the vehicle to strike any leafy plants adjacent the main shaft with the main shaft's tines, thereby removing leaves from the plants, and B. the boom arm may pivot between an unfolded state wherein the arm shaft is approximately parallel to the main shaft to a folded state wherein the arm shaft is approximately perpendicular to the main support arm.

21. The defoliator of claim 20 wherein the tines extend tangentially from a coil spring affixed to the main shaft.

22. The defoliator of claim 20:

a. further including:
 (1) opposing upper and lower mounts, wherein one of the mounts has a slot defined therein,
 (2) a pin extending within the slot, the pin being pivotally affixed to the mount opposite the slotted mount,
b. wherein the boom arm either:
 (1) has the upper and lower mounts affixed to opposing upper and lower sides of the boom arm, or
 (2) has the pin extending between opposing upper and lower sides of the boom arm.

23. The defoliator of claim 22 wherein the boom arm has a ground-engaging boom arm wheel descending therefrom.

24. The defoliator of claim 22 wherein the pin bears a ball pivotally affixed within a socket on the mount opposite the slotted mount.

25. The defoliator of claim 22 wherein the slot has a length extending approximately parallel to the arm shaft.

26. A method of using the defoliator of claim 20, the method including the steps of:

a. mounting the frame to a vehicle, and
b. simultaneously:
 (1) driving the vehicle across a field having leafy plants thereon, and
 (2) rotating the main shaft, thereby striking the plants with the tines, with the rotation being such that some of the leaves of the plants are removed.

27. The method of claim 26 wherein the plants are soybeans.

* * * * *

UNITED STATES PATENT AND TRADEMARK OFFICE
CERTIFICATE OF CORRECTION

PATENT NO. : 10,918,002 B1
APPLICATION NO. : 16/120806
DATED : February 16, 2021
INVENTOR(S) : Marlo Groezinger Page 1 of 1

It is certified that error appears in the above-identified patent and that said Letters Patent is hereby corrected as shown below:

On the Title Page

At (71) Applicant: and (72) Inventor: please insert:
--Marlo Groezinger, Freeport, IL (US)--

Signed and Sealed this
Twenty-seventh Day of July, 2021

Drew Hirshfeld
*Performing the Functions and Duties of the
Under Secretary of Commerce for Intellectual Property and
Director of the United States Patent and Trademark Office*